United States Patent
Lim et al.

(10) Patent No.: US 11,271,437 B2
(45) Date of Patent: Mar. 8, 2022

(54) WIRELESS POWER RELAYING DEVICE AND DISPLAY SYSTEM THAT DISTRIBUTES POWER WIRELESSLY

(71) Applicant: Samsung Electronics Co., Ltd., Suwon-si (KR)

(72) Inventors: Sang-Min Lim, Suwon-si (KR); Young Ho Choi, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 97 days.

(21) Appl. No.: 16/743,447

(22) Filed: Jan. 15, 2020

(65) Prior Publication Data

US 2020/0227950 A1 Jul. 16, 2020

(30) Foreign Application Priority Data

Jan. 15, 2019 (KR) .................. 10-2019-0005080

(51) Int. Cl.
*H02J 50/50* (2016.01)
*G06F 1/26* (2006.01)
(Continued)

(52) U.S. Cl.
CPC .............. *H02J 50/50* (2016.02); *G06F 1/266* (2013.01); *H02J 50/12* (2016.02); *H02J 50/90* (2016.02)

(58) Field of Classification Search
CPC . H02J 50/50; H02J 50/90; H02J 50/12; G06F 1/266; G06F 1/26
See application file for complete search history.

(56) References Cited

U.S. PATENT DOCUMENTS 10,403,113 B1 * 9/2019 Antar .................. B60L 3/00
2010/0244767 A1 9/2010 Turner et al.
(Continued)

FOREIGN PATENT DOCUMENTS

KR 10-2012-0040779 A 4/2012
KR 10-2015-0090668 A 8/2015
(Continued)

OTHER PUBLICATIONS

International Search Report dated May 19, 2020, in corresponding International Patent Application No. PCT/KR2020/000718.
(Continued)

*Primary Examiner* — Vuthe Siek
(74) *Attorney, Agent, or Firm* — Staas & Halsey, LLP (57) ABSTRACT

A wireless power relaying device and a display system that distributes power wirelessly. A wireless power relaying device includes a relay coil producing a second magnetic field by a current induced from a first magnetic field produced from a first external device, and a magnetic body on which the relay coil is arranged. The magnetic body includes first, second, and third magnetic bodies arranged at a same distance from each other. A direction in which the relay coil is wound around the first magnetic body is different from a direction in which the relay coil is wound around the second and third magnetic bodies. The direction in which the relay coil is wound around the second coil is the same as the direction in which the relay coil is wound around the third coil. A power signal is sent to a second external device through the second magnetic field.

20 Claims, 7 Drawing Sheets

(51) Int. Cl.
*H02J 50/90* (2016.01)
*H02J 50/12* (2016.01)

(56) References Cited

U.S. PATENT DOCUMENTS

| | | | |
|---|---|---|---|
| 2012/0223573 A1* | 9/2012 | Schatz | H02J 7/0029 |
| | | | 307/9.1 |
| 2013/0005252 A1* | 1/2013 | Lee | H02J 50/90 |
| | | | 455/41.1 |
| 2014/0091633 A1 | 4/2014 | Walley et al. | |
| 2014/0125145 A1 | 5/2014 | Bae | |
| 2015/0244178 A1 | 4/2015 | Tang | |
| 2015/0137749 A1* | 5/2015 | Park | H02J 50/40 |
| | | | 320/108 |
| 2016/0013661 A1 | 1/2016 | Kurs et al. | |
| 2018/0254655 A1 | 9/2018 | Liao | |
| 2018/0301940 A1 | 10/2018 | Yeo et al. | |
| 2019/0124726 A1* | 4/2019 | Moon | H05B 6/1272 |

FOREIGN PATENT DOCUMENTS

| | | |
|---|---|---|
| KR | 10-2019-0121640 | 10/2019 |
| WO | WO 2013/069951 | 5/2013 |

OTHER PUBLICATIONS

Extended European Search Report dated Nov. 12, 2021, in European Application No. EP 20 74 0910.

\* cited by examiner

(a) POWER TRANSMIT COIL (b) RELAY COIL (c) DISPLAY COIL

WIRELESS POWER RELAYING DEVICE AND DISPLAY SYSTEM THAT DISTRIBUTES POWER WIRELESSLY

CROSS-REFERENCE TO RELATED APPLICATION

This application is based on and claims priority under 35 U. S. C. § 119 to Korean Patent Application No. 10-2019-0005080 filed on Jan. 15, 2019, the disclosure of which is incorporated herein by reference in its entirely.

BACKGROUND

1. Field

The disclosure relates to a wireless power relaying device and a display system that distributes power wirelessly, and more particularly, to a technology to reduce electromagnetic interference (EMI) induced by wireless power transmission by designing a wireless power relaying device that transmits power wirelessly.

2. Discussion of Related Art

In modern society, many different technologies to improve performance of displays and speaker systems compatible with the displays are being developed.

For the display system, various methods for supplying power to the display and speaker are also being discussed. Technologies for wireless power transmission that supply power without using power cables have recently received much attention. If the wireless power transmission technology is commercialized, it may supply energy easily and transmit power without entangled wires that are otherwise equipped in the display system, as compared to wired charging systems currently in use.

Of those wireless power transmission technologies, one based on magnetic resonance receives power from an alternate current (AC) source and generates an AC current in a transmit coil coupled with a resonance coil, enabling the resonance coil to transmit power. The wireless power transmission based on the magnetic resonance may transmit power father away than in the electromagnetic method, but needs to be more improved because the transmittable range is still short.

It also requires extra devices and circuits to secure a wireless power transmission range, which increases material costs, reduces efficiency, and causes power loss.

Furthermore, a method of efficiently reducing electromagnetic interference (EMI) due to leakage of a magnetic field caused by the wireless power transmission is becoming more important these days.

SUMMARY

In accordance with an aspect of the disclosure, a wireless power relaying device includes a relay coil producing a second magnetic field by a current induced from a first magnetic field produced from a first external device; and a magnetic body on which the relay coil s arranged, wherein: the magnetic body comprises first, second, and third magnetic bodies arranged at a same distance from each other, a direction in which the relay coil is wound around the first magnetic body is different from a direction in which the relay coil is wound around each of the second and third magnetic bodies, and the direction in which the relay coil is wound around the second coil is the same as the direction in which the relay coil is wound around the third coil, and a power signal is sent to a second external device through the second magnetic field.

The second magnetic body may be arranged a predefined distance away from one end of the first magnetic body, the third magnetic body may be arranged the predefined distance away from the other end of the first magnetic body, and a distance between the first and second magnetic bodies and a distance between the first and third magnetic bodies may be the same.

The number of turns of the relay coil wound around the second magnetic body and the number of turns of the relay coil wound around the third magnetic body may be the same, and each of the number of turns of the relay coil wound around the second magnetic body and the number of turns of the relay coil wound around the third magnetic body may be less than the number of turns of the relay coil wound around the first magnetic body by a predefined number of turns.

The relay coil may include a coil wound around the first magnetic body, a coil wound around the second magnetic body, and a coil wound around the third magnetic body, which may be connected in series.

The second and third magnetic bodies may have the same thickness as the first magnetic body or may be thinner than the first magnetic body by a predefined value.

The wireless power relaying device may further include a power supply circuit configured to supply power to the wireless power relaying device, and the power supply circuit may include a load module configured to perform a function using the supplied power.

The power supply circuit may include a power supply coil arranged on the magnetic body, and the power supply coil may be wound in the same direction as the relay coil wound around the first magnetic body.

The load module may include a sound output module configured to output a sound.

The relay coil may be wound at a predefined position of the magnetic body, and the predefined position may include a center and either end of the magnetic body.

The relay coil may be wound on the center of the magnetic body and on either end of the magnetic body in different directions, and may be wound on both ends of the magnetic body in the same direction.

The wireless power relaying device may further include a power supply magnetic body supplying power to the wireless power relaying device, and the power supply magnetic body may be connected to the power supply circuit.

The relay coil wound on the center of the magnetic body may be connected to the power supply magnetic body.

In accordance with another aspect of the disclosure, a display system for wirelessly supplying power includes a display system including a wireless power transmitter configured to transmit a first power signal to a speaker by converting power supplied from a power source to a first magnetic field; the speaker including a relay coil producing a second magnetic field by a first current induced from the first magnetic field produced front the wireless power transmitter, and a relay magnetic body on which the relay coil is arranged, and sending a second power signal to a display through the second magnetic field; and the display including a display coil producing a third magnetic field by a second current induced from the second magnetic field produced from the speaker, and a display magnetic body on which the display coil is arranged, and an image output module configured to output an image using power sent through the second current, wherein the relay magnetic body includes first, second, and third relay magnetic bodies arranged at a same distance from each other, and wherein a direction in which the relay coil is wound around the first relay magnetic body is different from a direction in which the relay coil is wound around each of the second and third relay magnetic bodies, and the direction in which the relay coil is wound around the second relay magnetic body is the same as the direction in which the relay coil is wound around the third relay magnetic body.

In the relay magnetic body, the second relay magnetic body may be arranged a predefined distance away from one end of the first relay magnetic body, and the third relay magnetic body may be arranged the predefined distance away from the other end of the first relay magnetic body, and a distance between the first and second relay magnetic bodies and a distance between the first and third relay magnetic bodies may be the same.

The number of turns of the relay coil wound around the second relay magnetic body and the number of turns of the relay coil wound around the third relay magnetic body may be the same, and each of the number of turns of the relay coil wound around the second relay magnetic body and the number of turns of the relay coil wound around the third relay magnetic body may be less than the number of turns of the relay coil wound around the first relay magnetic body by a predefined number of turns.

The relay coil may include a coil wound around the first relay magnetic body, a coil wound around the second relay magnetic body, and a coil wound around the third relay magnetic body, which may be connected in series.

The second and third relay magnetic bodies may have the same thickness as the first relay magnetic body or are thinner than the first relay magnetic body by a predefined value.

The speaker may include a power supply circuit configured to supply power to the speaker, and the power supply circuit may include a load module configured to perform a function using the supplied power.

The power supply circuit may include a power supply coil arranged on the magnetic body, and the power supply coil may be wound in the same direction as the relay coil wound around the first relay magnetic body.

The load module may include a sound output module configured to Output a sound.

The display magnetic body may include first and second display magnetic bodies arranged at a predefined distance from each other, and the display coil may be wound around each of the first and second display magnetic bodies in the same direction.

The relay coil may be wound at a predefined position of the relay magnetic body, and the predefined position may include a center and either end of the relay magnetic body.

The relay coil may be wound on the center of the relay magnetic body and on either end of the relay magnetic body in different directions, and may be wound on both ends of the relay magnetic body in the same direction.

The speaker may further include a power supply magnetic body supplying power to the speaker, and the power supply magnetic body may be connected to the power supply circuit.

The relay coil wound on the center of the relay magnetic body may be connected to the power supply magnetic body.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Advantages, features, and methods for achieving them will be understood more clearly when the following embodiments are read with reference to the accompanying drawings.

Embodiments and features as described and illustrated in the present disclosure are only preferred examples, and various modifications thereof may also fall within the scope of the disclosure.

The terminology used herein is for the purpose of describing particular embodiments only and is not intended to limit the disclosure. It is to be understood that the singular forms "a," "an," and "the" include plural references unless the context clearly dictates otherwise.

The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. For example, a first element could be termed a second element and vice versa, without departing from the scope of the disclosure. Descriptions shall be understood as to include any and all combinations of one or more of the associated listed items when the items are described by using the conjunctive term and/or "~and/or~" or the like.

Embodiments of a wireless power relaying device and a display system that receives power wirelessly will be described in detail with reference to accompanying drawings. Like reference numerals refer to like components throughout the drawings, and thus the related descriptions that overlap will be omitted.

Figure 1:
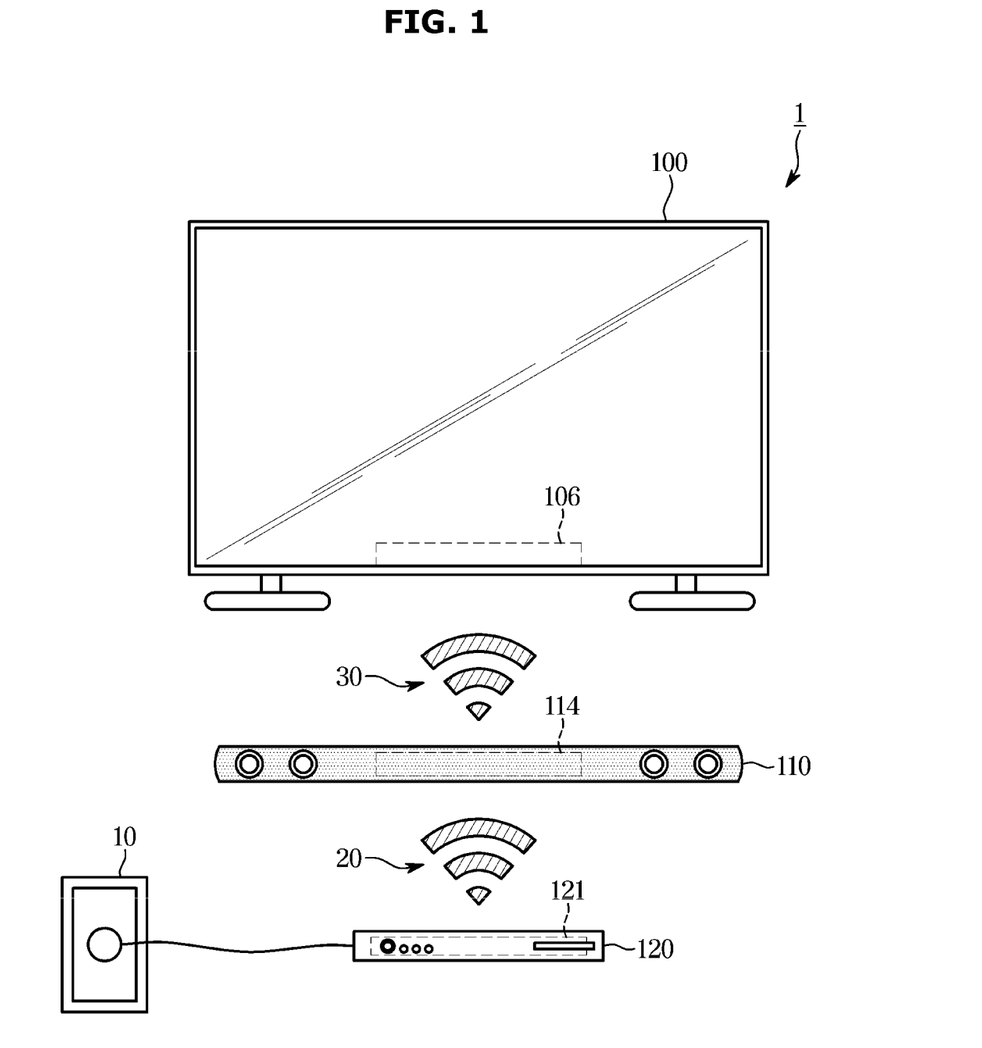
FIG. 1 shows a display system, according to an embodiment of the disclosure.

FIG. 1 shows a display system, according to an embodiment of the disclosure.

Referring to FIG. 1, a display system 1 may include a wireless power transmitter 120, a speaker 110, and a display 100.

The display 100 may be implemented in a screen type such as to display a television (TV) screen. Recently, the display 100 has a tendency to get slimmer without bezels, and the speaker of the display 100 is implemented as being separated from the display 100.

Accordingly, as shown in FIG. 1, the speaker 110 may be shaped like a sound bar that is physically separated from the display 100, emitting sound in the forward direction to improve output sound quality.

As will be described later, the speaker 110 according to an embodiment of the disclosure may be implemented as a wireless power relaying device equipped with a resonator therein to receive wireless power from the wireless power transmitter 120 and transmit the wireless power to the display 100.

A resonant circuit provided in the speaker 110 may be designed to drive an internal circuit for a function of the speaker 110 as well as to wirelessly forward the power to the display 100.

In the display system 1, the display 100 may be implemented in a wall-mounted TV type, and various connecting jacks included in the display 100 are arranged in a separate jack pack to be easily connected to an external device.

For example, a high definition multimedia interface (HDMI) terminal, an antenna connecting terminal, an input/output terminal, etc., may be arranged in the jack pack, and in an embodiment of the disclosure, the wireless power transmitter 120 may be implemented with the jack pack. In another embodiment of the disclosure, the wireless power transmitter 120 may be implemented with a set-top box, without being limited thereto.

The wireless power transmitter 120 implemented in the jack pack type, the speaker 110 serving as a wireless power relaying device to wirelessly transmit power to the display 100, and the display 100 implemented in a wall-mounted TV type may make the display system 1 wireless and secure convenient connectivity and aesthetic benefits of the display system 1.

The display system 1 may wirelessly transmit or receive power and output content through components included in the display system 1. For example, the content may be stored in the display system 1 or received from an external device, e.g., a set-top box, a jack pack, a digital versatile disk (DVD) player, etc. The content may include image information and sound information.

In an embodiment of the disclosure, the display system 1 may distribute power wirelessly to the respective components to display the content.

In an embodiment of the disclosure, the wireless power transmitter 120 may be connected to an external power source 10 to receive power. The external power source 10 may apply alternate current (AC) voltage in a designated range, e.g., from about 85 to about 256 volts (V) of a wall power source or a commercial power source, to the display system 1.

In an embodiment of the disclosure, the wireless power transmitter 120 may transmit power supplied from the external power source 10 to an external device. For example, the wireless power transmitter 120 may transmit a first power signal 20 to an external device, e.g., the speaker 110 based on the input or supplied power. For example, the first power signal 20 may be a signal to wirelessly transmit power generated by an input power source, e.g., the external power source 10.

In an embodiment of the disclosure, the wireless power transmitter 120 may generate the first power signal 20 by producing a magnetic field through a power transmit coil 123 (see FIG. 2) provided on a power transmit magnetic body 122. Accordingly, the wireless power transmitter 120 may transmit the first power signal 20 to the speaker 110 by converting the power supplied from the external power source 10 to a magnetic field (or a first magnetic field).

In an embodiment of the disclosure, the wireless power transmitter 120 may supply power to the external device not only wirelessly but also wiredly.

For example, the wireless power transmitter 120 may supply power to an external device wiredly connected thereto. For example, the external device may be a device for performing an additional function.

In an embodiment of the disclosure, the speaker 110 may relay the power transmitted from the wireless power transmitter 120 to the external device. For example, the speaker 110 may receive the first power signal 20 from the wireless power transmitter 120 and transmit a second power signal 30 to the external device based on the received first power signal 20.

For example, the second power signal 30 may be generated based on part of the power received through the first power signal 20.

In an embodiment of the disclosure, the speaker 110 may relay power with a relay coil 115 (see FIG. 2) provided on a relay magnetic body 114 when induced electromotive force is generated in the relay coil 115 by a magnetic field produced by the wireless power transmitter 120 and the induced electromotive force produces a magnetic field.

In an embodiment of the disclosure, the speaker 110 may output a designated sound. For example, the speaker 110 may output a sound included in the content based on part of the first power signal 20 received from the wireless power transmitter 120. As such, the speaker 110 may output the designated sound while relaying power to the external device.

In an embodiment of the disclosure, the speaker 110 may be a wireless power relaying device that relays the power signal, e.g., the first power signal 20, transmitted from the wireless power transmitter 120 to the display 100. The wireless power relaying device may be implemented with a relay, a repeater, or the like. The wireless power relaying device may output a sound included in the content.

In an embodiment of the disclosure, the display 100 may receive power from the speaker 110. In other words, the display 100 may receive the power forwarded or relayed by the speaker 110. For example, the display 100 may receive the second power signal 30.

In an embodiment of the disclosure, the display 100 may include a display coil 104 provided on a display magnetic body 106, and receive the second power signal 30 as the display coil 104 resonates with a magnetic field produced by the speaker 110 and produces induced electromotive force.

According to an embodiment of the disclosure, the display 100 may output a designated image by using the received power signal, e.g., the second power signal 30, and the designated image may be included in the content.

As described above, the display system 1 may include the display 100, the speaker 110, and the wireless power transmitter 120, and transmit or receive content in a power signal through wireless power transmission or reception between the components.

In this case, electromagnetic interference (EMI) might be caused by a leaked magnetic field generated due to the wireless power transmission, and might have an influence on transmission or reception of the content, so a need to reduce the EMI is ever increasing.

In the display system 1 according to an embodiment of the disclosure, a wireless power relaying device for transmitting power wirelessly is designed to have such a structure that smoothly transmits wireless power to the display 100 and reduce EMI caused by the wireless power transmission.

Figure 2:
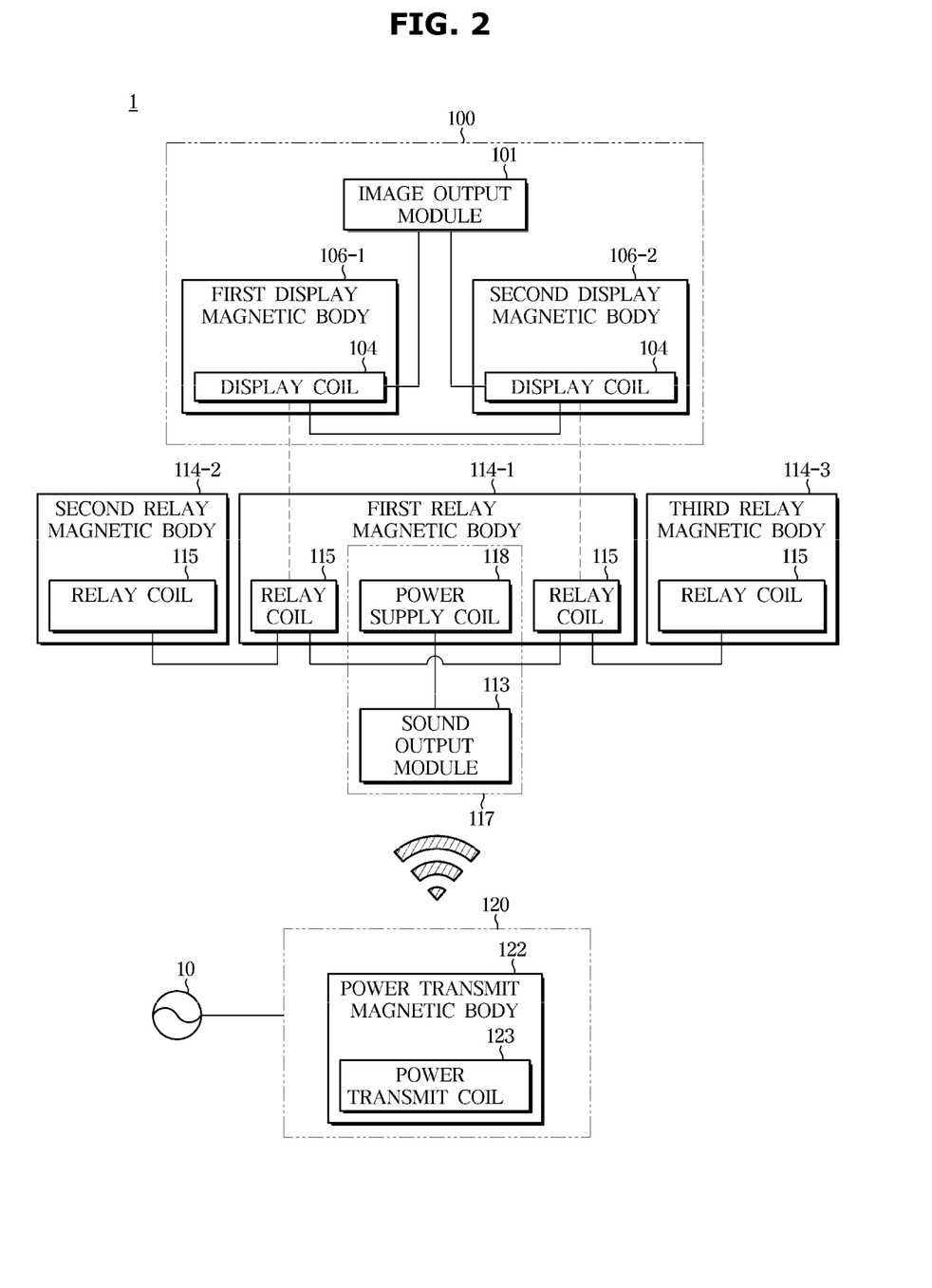
FIG. 2 is a block diagram of a wireless power relaying device and a display system, according to an embodiment of the disclosure.
Figure 3:
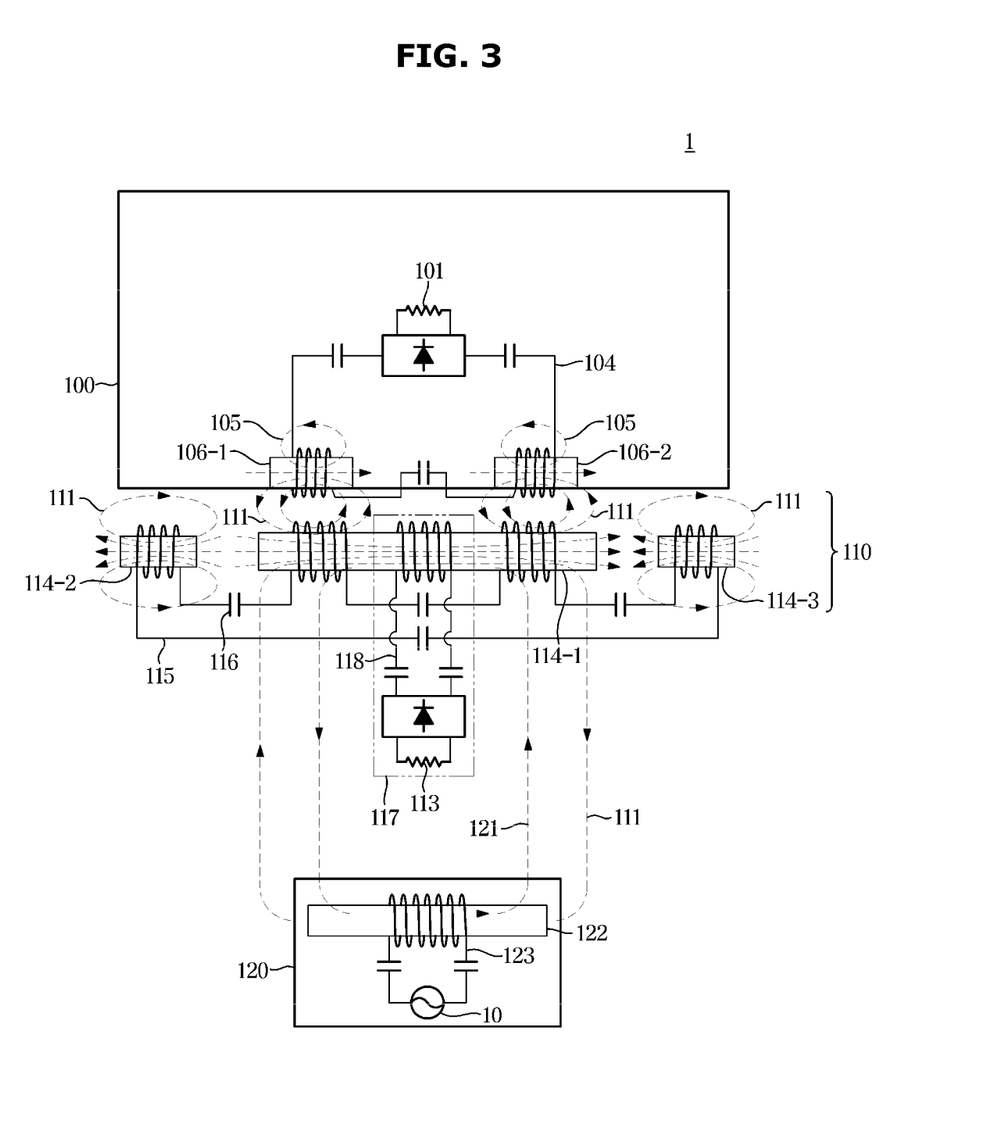
FIG. 3 is a circuit diagram of a wireless power relaying device and a display system, according to an embodiment of the disclosure.

FIG. 2 is a block diagram of a wireless power relaying device and a display system, according to an embodiment of the disclosure, and FIG. 3 is a circuit diagram of a wireless power relaying device and a display system, according to an embodiment of the disclosure.

Referring to FIG. 2, the display 100 of the display system 1 may include an image output module 101 and a display magnetic body 106, around which the display coil 104 may be wound.

The display magnetic body 106 may include a first display magnetic body 106-1 and a second display magnetic body 106-2 arranged a predefined distance away from the first display magnetic body 106-1, and the display coil 104 may be wound around each of the first and second display magnetic bodies 106-1 and 106-2 in the same direction. The predefined distance between the first and second display magnetic bodies 106-1 and 106-2 may be set depending on the arrangement of the display magnetic body 106 in the design of the display 100.

The speaker 110 of the display system 1 may be implemented as a wireless power relaying device. In an embodiment of the disclosure, the speaker 110 may include a relay magnetic body 114, around which the relay coil 115 may be wound.

The speaker 110 may also include a power supply coil 118 wound around the relay magnetic body 114.

Furthermore, the speaker 110 may include a load module 113 that performs a function of the speaker 110 using the received power, and the load module 113 may be implemented as a sound output module 113 that outputs sound.

The relay magnetic body 114 may include a first relay magnetic body 114-1, a second relay magnetic body 114-2, and a third relay magnetic body 114-3, which are separated from one another by a predefined distance.

For example, the second relay magnetic body 114-2 may be arranged the predefined distance away from one end of the first relay magnetic body 114-1, and the third relay magnetic body 114-3 may be arranged the predefined distance away from the other end of the first relay magnetic body 114-1.

In other words, as shown in FIG. 3, in the speaker 110, the first relay magnetic body 114-1 is located in the middle and the second and third relay magnetic bodies 114-2 and 114-3 are located on either side of the first relay magnetic body 114-1.

The predefined distance between the first, second, and third relay magnetic bodies 114-1, 114-2 and 114-3 may be set depending on the arrangement of the relay magnetic body 114 in the design of the speaker 110.

The relay coil 115 may be wound around each of the first to third relay magnetic bodies 114-1 to 114-3. For example, as shown in FIG. 3, relay coil 115 can include a plurality of relay coils, with a relay coil (or multiple relay coils as shown in FIG. 3) being wound around the first relay magnetic body 114-1, another relay coil being wound around the second relay magnetic body 114-2, and another relay coil being wound around the third relay magnetic body 114-3.

The relay coils 115 wound around the first to third relay magnetic bodies 114-1 to 114-3 may be connected in series to each other.

As shown in FIG. 3, a direction in which the relay coil 115 is wound around the first relay magnetic body 114-1 and directions in which the relay coils 115 are wound around the second and third relay magnetic bodies 114-2 and 114-3 are different, and the directions in which the relay coils 115 are wound around the second and third relay magnetic bodies 114-2 and 114-3 may be the same.

As the direction in which the relay coil 115 is wound around the first relay magnetic body 114-1 is opposite the directions in which the relay coil 115 is wound around each of the second and third relay magnetic bodies 114-2 and 114-2, the leaked magnetic field may be canceled out, thereby reducing EMI. This will be described in detail in connection with FIG. 3.

The number of turns of the relay coil 115 wound around the second relay magnetic body 114-2 is the same as the number of turns of the relay coil 115 wound around the third relay body 114-3, and each of the number of turns of the relay coil 115 wound around the second relay magnetic body 114-2 and the number of turns of the relay coil 115 wound around the third relay body 114-3 may be less than the number of turns of the relay coil 115 wound around the first relay magnetic body 114-1 by a predetermined number of turns.

Depending on mutual inductance of the relay coils 115 wound around the second and third relay magnetic bodies 114-2 and 114-3, inductance of the relay coil 115 wound around the first relay magnetic body 114-1 increases or decreases. Accordingly, the number of turns of the relay coils 115 wound around the second and third relay magnetic bodies 114-2 or 114-3 may be determined in such a range that magnetic fields produced from the relay coils 115 wound around the second and third relay magnetic bodies 114-2 and 114-3 cancel out the leaked magnetic field produced from the relay coil 115 wound around the first relay magnetic body 114-1 without significantly reducing inductance L1 of the first relay magnetic body 114-1.

For example, when the number of turns of the relay coil 115 wound around the first relay magnetic body 114-1 is 5, the number of turns of the relay coil 115 wound around each of the second and third relay magnetic bodies 114-2 and 114-3 may be 4.

The speaker 110 may further include a power supply circuit 117 for supplying power to the speaker 110, and the power supply circuit 117 may include a power supply coil 118 wound around the first relay magnetic body 114-1, and the sound output module 113 that corresponds to a load for performing a function based on the supplied power.

The power supply coil 118 may be wound in the same direction as the direction in which the relay coil 115 is wound around the first relay magnetic body 114-1.

Unlike in the prior art that supplies power using an active device composed of R (resistor), L (inductor), and C (capacitor), a passive device including only L and C with the power supply coil 118 provided on the first relay magnetic body 114-1, is used in an embodiment of the disclosure to supply power to the speaker 110, so that power loss is reduced and the need for additional circuit installation is eliminated.

The wireless power transmitter 120 of the display system 1 may include a power transmit magnetic body 122, around which a power transmit coil 123 may be wound.

The wireless power transmitter 120 may be connected to the external power source 10 to receive power. The external power source 10 may apply an AC voltage in a designated range, e.g., from about 85 to about 256 volts (V) of a wall power source or a commercial power source, to the display system 1.

In an embodiment of the disclosure, the wireless power transmitter 120 may transmit the first power signal 20 to the speaker 110 by converting the power supplied from the power source 10 to a first magnetic field 121.

The relay coil 115 provided on the relay magnetic body 114 of the speaker 110 may produce a second magnetic field 111 by a first current induced from the first magnetic field 121 produced from the wireless power transmitter 120.

The speaker 110 may forward the second power signal 30 to the display 100 through the second magnetic field 111 produced by the relay coil 115 provided on the relay magnetic body 114. Specifically, the second current is induced in the display coil 104 provided on the display magnetic body 106 by the second magnetic field 111 produced from the relay coil 115 of the speaker 110, so that the second power signal 30 may be forwarded from the speaker 110 to the display 100.

The display coil 104 provided on the display magnetic body 106 of the display 100 may produce a third magnetic field 105 by the second current induced from the second magnetic field 111 produced from the speaker 110.

The image output module 101 of the display 100 may output an image on the screen based on the power forwarded through the second current induced from the second magnetic field 111.

Specifically, referring to FIG. 3, when AC power is applied to the wireless power transmitter 120 from the power source 10, the power transmit magnetic body 122 produces the first magnetic field 121 due to the current flowing in the power transmit coil 123.

The first magnetic field 121 produced from the power transmit magnetic body 122 induces the first current that corresponds to an induced current in the relay coil 115 provided on the relay magnetic body 114 of the speaker 110.

The relay coil 115 may produce the second magnetic field 111 by the first current, and a direction of the second magnetic field 111 is opposite the direction of the first magnetic field 121.

Specifically, the first magnetic field 121 produced from the power transmit magnetic body 122 causes an induced current to flow in the relay coil 115 of the speaker 110, and the second magnetic field 111 is produced on and around the relay magnetic body 114 according to Lenz's law about the direction of electromagnetic induction.

As shown in FIG. 3, the first magnetic field 121 induces the first current in the entire relay coil 115 provided on the first to third relay magnetic bodies 114-1 to 114-3 of the speaker 110, and the first current produces the second magnetic field 111 on and around each of the first to third relay magnetic bodies 114-1 to 114-3 of the speaker 110.

The speaker 110 may forward the second power signal 30 to the display 100 through the second magnetic field 111.

The second magnetic field 111 produced from the relay magnetic body 114 of the speaker 110 induces the second current that corresponds to an induced current in the display coil 104 provided on the display magnetic body 106 of the display 100.

The display coil 104 may produce the third magnetic field 105 by the second current, and a direction of the third magnetic field 105 is opposite the direction of the second magnetic field 111.

Specifically, the second magnetic field 111 produced from the relay magnetic body 114 causes an induced current to flow in the display coil 104 of the display 100, and the third magnetic field 105 is produced on and around the display magnetic body 106 according to Lenz's law.

As shown in FIG. 3, the second magnetic field 111 from the relay coil 115 provided on the first relay magnetic body 114 induces the second current in the entire display coils 104 provided on the first and second display magnetic bodies 106-1 to 106-2 of the display 100, and the second current produces the third magnetic field 105 on and around each of the first and second display magnetic bodies 106-1 to 106-2.

The image output module 101 of the display 100 may output an image on the screen based on the power forwarded through the second current induced from the second magnetic field 111.

As described above, the first magnetic field 121 is produced from the wireless power transmitter 120, and the third magnetic field 105 is produced in the display 100.

In this case, when there is a phase difference as much as 180° between the first and third magnetic fields 121 and 105, a leaked magnetic field caused from the first magnetic field 121 is canceled out by the third magnetic field 105, thereby reducing EMI created from the first magnetic field 121.

As such, with the speaker 110 installed between the wireless power transmitter 120 and the display 100 to transmit power in a wireless power relaying method, the magnetic field from the wireless power transmitter 120 and the magnetic field in the display 100 may cancel each other out, thereby reducing creation of EMI due to the leaked magnetic field.

Such a method of reducing EMI based on phase difference between magnetic fields will be described in connection with FIG. 4.

Figure 4:
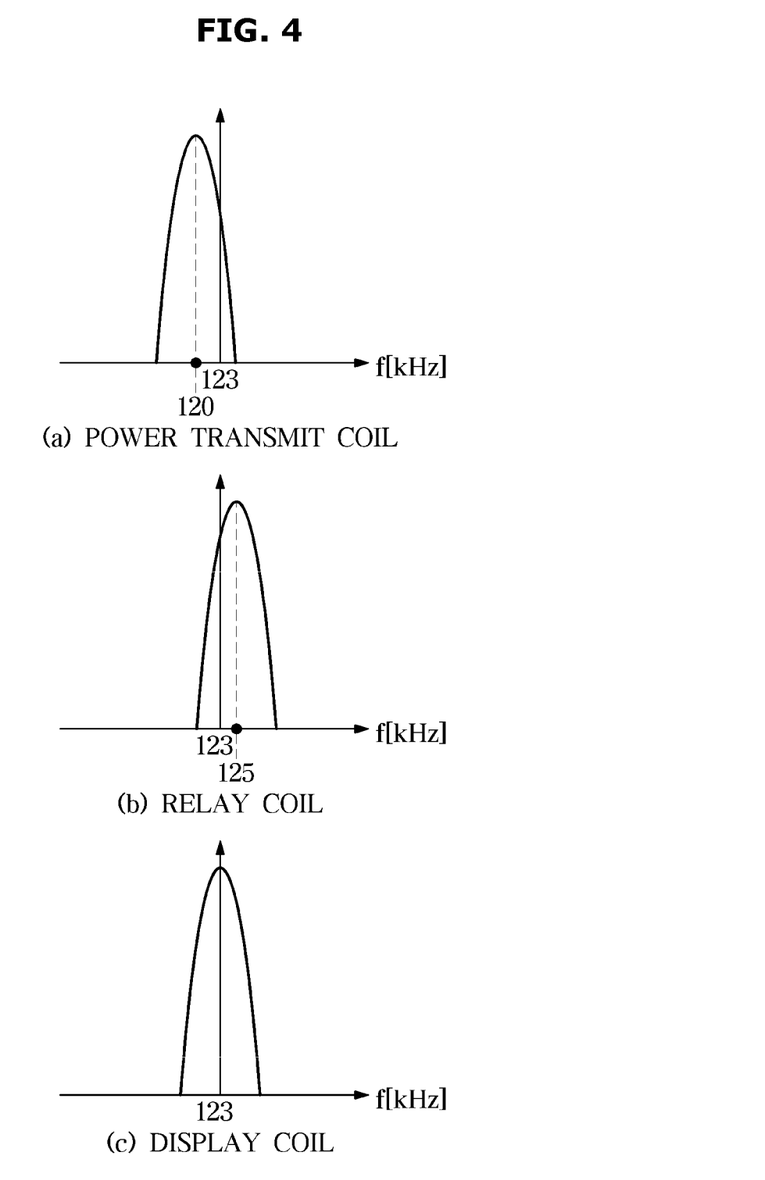
FIG. 4 shows graphs for explaining phase differences between currents flowing in a power transmit coil, a relay coil, and a display coil, according to an embodiment of the disclosure.

FIG. 4 shows graphs for explaining phase differences between currents flowing in a power transmit coil, a relay coil, and a display coil, according to an embodiment of the disclosure.

Referring to FIG. 4, in a design where the power transmit coil 123 of the wireless power transmitter 120 operates in an inductive area; the relay coil 115 of the speaker 110 operates in a capacitive area; and the display coil 104 of the display 100 operates at a resonance frequency, there is a phase difference of 180° between a current flowing in the power transmit coil 123 and a current flowing in the display coil 104.

As shown in FIG. 4, for example, when the resonance frequency of the power transmit coil 123 is 120 KHz and the frequency of an AC magnetic field is 123 KHz, the resonance frequency of the power transmit coil 123 is higher than the switching frequency of the AC magnetic field, so the power transmit coil 123 is in the inductive area where the switching frequency of the AC magnetic field is located farther to the right than the resonance frequency of the power transmit coil 123 on a coordinate axis of resonance frequency.

In another example, when the resonance frequency of the relay coil 115 is 125 KHz and the frequency of the AC magnetic field is 123 KHz, the resonance frequency of the relay coil 115 is lower than the switching frequency of the AC magnetic field, so the relay coil 115 is in the capacitive area where the switching frequency of the AC magnetic field is located farther to the left than the resonance frequency of the relay coil 115 on a coordinate axis of resonance frequency.

For the display coil 104 of the display 100, the resonance frequency and the switching frequency of the AC magnetic field corresponds to each other at 123 KHz for maximum efficiency of power transfer.

When the power transmit coil 123, the relay coil 114, and the display coil 104 are designed to operate with the aforementioned settings, there is a phase difference of 90° between the current flowing in the power transmit coil 123 and the current flowing in the relay coil 114 and between the current flowing in the relay coil 114 and the current flowing in the display coil 104, and as a result, there is a phase difference of 150° between the current flowing in the power transmit coil 123 and the current flowing in the display coil 104.

Accordingly, with the phase difference of 180° between the first magnetic field 121 produced from the wireless power transmitter 120 and the third magnetic field 105 produced from the display 100, a leaked magnetic field caused from the first magnetic field 121 is canceled out by the third magnetic field 105, thereby reducing EMI created from the first magnetic field 121.

In the meantime, although the leaked magnetic field may be reduced in the aforementioned method by locating the speaker 110 between the wireless power transmitter 120 and the display 100, when there is only one relay magnetic body 114 provided in the speaker 110, a leaked magnetic field may be caused from the second magnetic field 111 produced from the speaker 110.

Accordingly, to reduce EMI due to the leaked magnetic field caused from the speaker 110, the second and third relay magnetic bodies 114-2 and 114-3 may be located on either side of the first relay magnetic body 114-1 of the speaker 110, to cancel out the leaked magnetic field caused from the first relay magnetic body 114-1.

As shown in FIG. 3, the second relay magnetic body 114-2 may be arranged a predefined distance away from one end of the first relay magnetic body 114-1, and the third relay magnetic body 114-3 may be arranged the predefined distance away from the other end of the first relay magnetic body 114-1. As described above, the predefined distance between the first, second, and third relay magnetic bodies 114-1, 114-2 and 114-3 may be set depending on the arrangement of the relay magnetic body 114 in the design of the speaker 110.

The relay coil 115 may be wound around each of the first to third relay magnetic bodies 114-1 to 114-3 and may be connected in series to each other.

A direction in which the relay coil 115 is wound around the first relay magnetic body 114-1 and directions in which the relay coils 115 are wound around the second and third relay magnetic bodies 114-2 and 114-3 are different, and the directions in which the relay coils 115 are wound around the second and third relay magnetic bodies 114-2 and 114-3 are the same.

Specifically, as shown in FIG. 3, for the three relay magnetic bodies 114, a direction in which the relay coil 115 is wound around a relay magnetic body located in the middle is opposite directions in which the relay coils 115 are wound around relay magnetic bodies located on the left and right.

With the winding directions of the relay coils 115, the leaked magnetic field caused from the second magnetic field 111 produced from the first relay magnetic body 114-1 is canceled out by the second magnetic field 111 produced from the second and third relay magnetic bodies 114-2 and 114-3, thereby reducing EMI.

In other words, the magnetic field produced from the first relay magnetic body 114-1 has an opposite direction to and is canceled out by the magnetic field produced from the second and third relay magnetic bodies 114-2, and 114-3, so that the leaked magnetic field may be reduced.

It is also possible for the relay coils 115 to be wound around the first to third relay magnetic bodies 114-1 to 114-3 in the opposite directions to what are shown in FIG. 3.

In the meantime, when the distance between the first and second relay magnetic bodies 114-1 and 114-2 and between the first and third relay magnetic bodies 114-1 and 114-3 is too short, the second magnetic fields 111 produced from the relay coils 115 cancel each other out and die off, leading to wireless power transmission loss. Hence, the distance between the first relay magnetic body 114-1 and the second relay magnetic body 114-2 on the left and between the first relay magnetic body 114-1 and the third relay magnetic body 114-3 on the right needs to be set to a predefined suitable distance, which is not too short.

The distance between the first and second relay magnetic bodies 114-1 and 114-2 and between the first and third relay magnetic bodies 114-1 and 114-3 may be set to such a distance that prevents the second magnetic fields 111 produced from the relay coils 115 from canceling each other out and dying off in the design of the speaker 110.

In other words, in designing the speaker 10, the predefined distance between the first, second, and third relay magnetic bodies 114-1, 114-2, and 114-3 may be determined by taking into account both magnetic field cancellation conditions and wireless power transmission loss conditions, and the first to third relay magnetic bodies 114-1 to 114-3 may be arranged according to the determined distance.

In this case, the distance between the first and second relay magnetic bodies 114-1 and 114-2 and the distance between the first and third relay magnetic bodies 114-1 and 114-3 may be the same. Specifically, the distance between the first and second relay magnetic bodies 114-1 and 114-2, which is called a first distance, and the distance between the first and third relay magnetic bodies 114-1 and 114-3, which is called a second distance, may be the same or different from each other depending on arrangement relations of the first to third relay magnetic bodies 114-1 to 114-3.

The reason why the distance between the first to third relay magnetic bodies 114-1 to 114-3 needs to be appropriately adjusted and spaced will now be described in detail.

For example, as the relay coil 115 wound around the first relay magnetic body 114-1 having inductance 11 and the relay coil 115 wound around each of the second and third relay magnetic bodies 114-2 and 114-3 having inductance L2 are connected in series and the winding directions thereof are opposite as described above, total inductance is $L=L1+L2-2*\sqrt{L1*L2}$.

k is a coupling coefficient of the relay coil 115, having a value between 0 and 1.

For example, when L1=2.3 mH, L2=0.47 mH, k=0.25, the total inductance=2.25 mH according to the above equation.

Based on the above equation, the total inductance L=2.25 mH, is less than the inductance L1=2.3 mH, of the relay coil 115 wound around the first relay magnetic body 114-1 by 0.05 mH.

The inductance L1 of the relay coil 115 wound around the first relay magnetic body 114-1 plays a role of relaying a magnetic field produced from the wireless power transmitter 20, and when the total inductance is reduced due to the relay coils 115 wound around the second and third magnetic bodies 114-2 and 114-3 in the other direction, the wireless power transmission efficiency deteriorates.

On the other hand, when k is 0.2, the total inductance L is 2.35 mH, which is larger than the inductance L1=2.3 mH, of the relay coil wound around the first relay magnetic body 114-1 by 0.05 mH.

In order to reduce the value of the coupling coefficient k of the relay coil 115, the distance between the relay coil 115 wound around the first relay magnetic body 114-1 and the relay coil 115 wound around the second or third relay magnetic body 114-2 or 114-3 needs to be widened, or the number of turns of the relay coil 115 wound around the second or third relay magnetic body 114-2 or 114-3 needs to be adjusted.

The aim of embodiments of the disclosure is to reduce EMI caused by a leaked magnetic field without deterioration of wireless power transmission efficiency, so the number of turns of the relay coil 115 wound around the second or third relay magnetic body 114-2 or 114-3 and the distance between the relay coils 115 wound around the magnetic bodies need to be adjusted in order to prevent the total inductance L from being less than the inductance L1 of the relay coil 115 wound around the first relay magnetic body 114-1.

The inductance of the relay coil 115 wound around the first relay magnetic body 114-1 may be obtained with a sufficient number of turns of the relay coil 115 in such a range that prevents the first relay magnetic body 114-1 from being saturated.

As such, for the relay magnetic body 114 of the display system 1 according to an embodiment of the disclosure, when the relay coil 115 wound around the first relay magnetic body 114-1 and the relay coils 115 wound around the second and third relay magnetic bodies 114-2 and 114-3 are connected in series to each other, the number of turns of the relay coils 115 and the distance between the relay coils 115 may be adjusted for the total inductance L to be equal to or larger than the inductance L1 of the relay coil 115 wound around the first relay magnetic body 114-1.

As shown in FIG. 3, the number of turns of the relay coil 115 wound around the second relay magnetic body 114-2 is the same as the number of turns of the relay coil 115 wound around the third relay body 114-3, and the number of turns of the relay coil 115 wound around the second relay magnetic body 114-2 and the number of turns of the relay coil 115 wound around the third relay body 114-3 may each be less than the number of turns of the relay coil 115 wound around the first relay magnetic body 114-1 by a predetermined number of turns.

In this case, the number of turns of the relay coil 115 wound around each of the second and third relay magnetic bodies 114-2 and 114-3, which is less than the number of turns of the relay coil 115 wound around the first relay magnetic body 114-1, may be set by taking into account the total inductance L and the inductance L1 of the coil 115 wound around the first relay magnetic body 114-1 as described above.

Depending on the mutual inductance of the relay coils 115 wound around the second and third relay magnetic bodies 114-2 and 114-3, the inductance L1 of the relay coil 115 wound around the first relay magnetic body 114-1 increases or decreases. Accordingly, the number of turns of the relay coils 115 wound around the second and third relay magnetic bodies 114-2 or 114-3 may be determined in such a range that magnetic fields produced from the relay coils 115 wound around the second and third relay magnetic bodies 114-2 and 114-3 cancel out the leaked magnetic field produced from the relay coil 115 wound around the first relay magnetic body 114-1 without significantly reducing inductance L1 of the first relay magnetic body 114-1.

The display system 1 according to the embodiment of the disclosure uses the speaker 110 as a wireless power relaying device to wirelessly transmit power to the display 100 while supplying power to the sound output module 113 provided in the speaker 110.

In order for the speaker 110 to efficiently relay wireless power to the display 100, a sufficient current is required to flow in the relay coils 115 of the speaker 110 to produce the second magnetic fields 111.

Specifically, when the relay coil 115 is connected directly to the sound Output module 113 to supply power to the sound output module 115, a load resistor of the sound output module 113 hinders a sufficient current flowing in the relay coil 115.

Hence, according to an embodiment of the disclosure, in order for a sufficient current to flow in the relay coil 115 of the speaker 110 while smoothly sending power to the sound output module 113, the power supply coil 118 may be wound around the relay magnetic body 114 with a predefined distance to the relay coil 115 so that the relay coil 115 for relaying power and the power supply coil 118 for sending power to the sound output module 113 are physically separated.

Referring to FIGS. 2 and 3, the speaker 110 may further include the power supply circuit 117 for supplying power to the speaker 110, and the power supply circuit 117 may include the power supply coil 118 wound around the first relay magnetic body 114-1, and the sound output module 113 that corresponds to a load to perform a function based on the supplied power.

In an embodiment of the disclosure, the power supply coil 118 may be wound in the same direction as the direction in which the relay coil 115 is wound around the first relay magnetic body 114-1.

Specifically, the power supply coil 118 may be wound around the first relay magnetic body 114-1 in a structure physically separated from the relay coil 115 wound around the first relay magnetic body 114-1, and currents flowing in the relay coil 115 and the power supply coil 118 are in phase.

As described above, a passive device including only L and C with the power supply coil 118 provided on the first relay magnetic body 114-1 is used to supply power to the speaker 110, thereby reducing power loss and eliminating the need for additional circuit installation.

Figure 5:
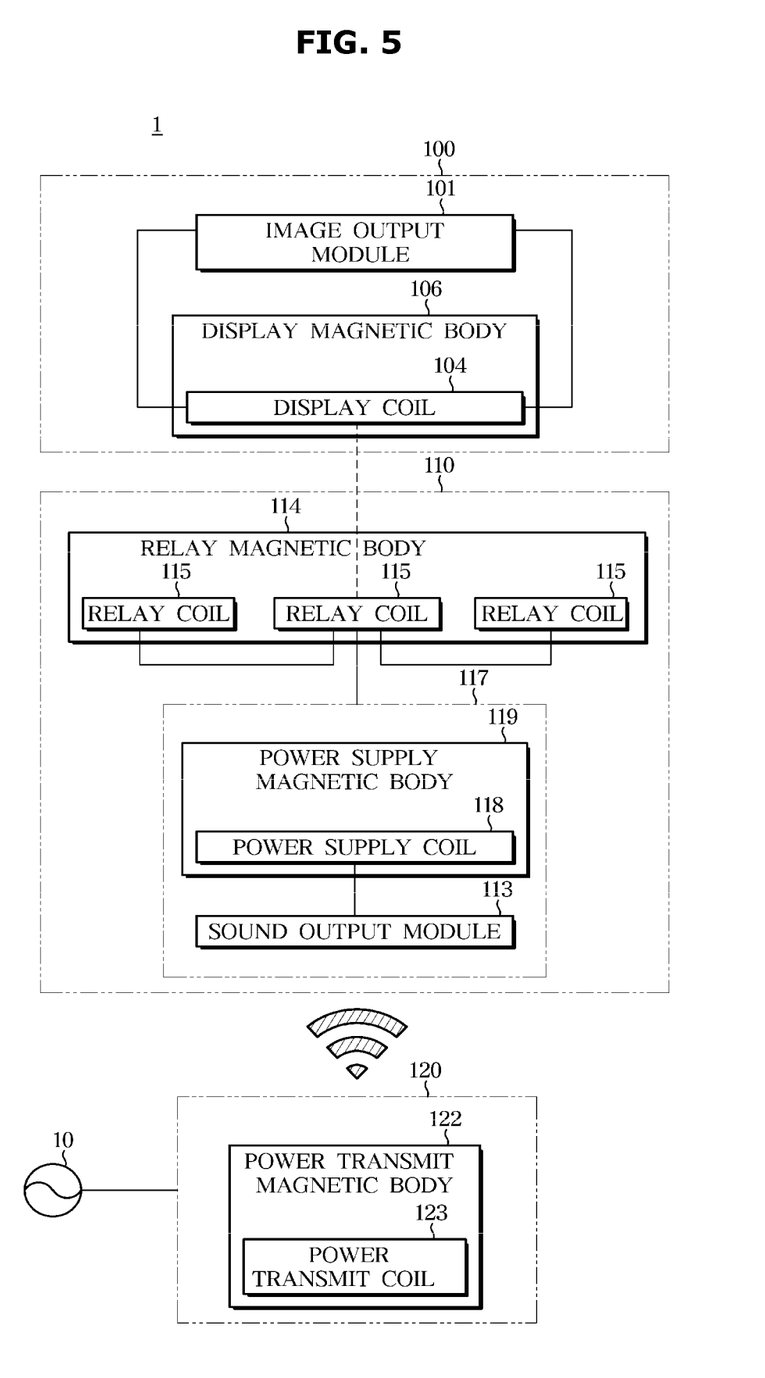
FIG. 5 is a block diagram of a wireless power relaying device and a display system, according to another embodiment of the disclosure.
Figure 6:
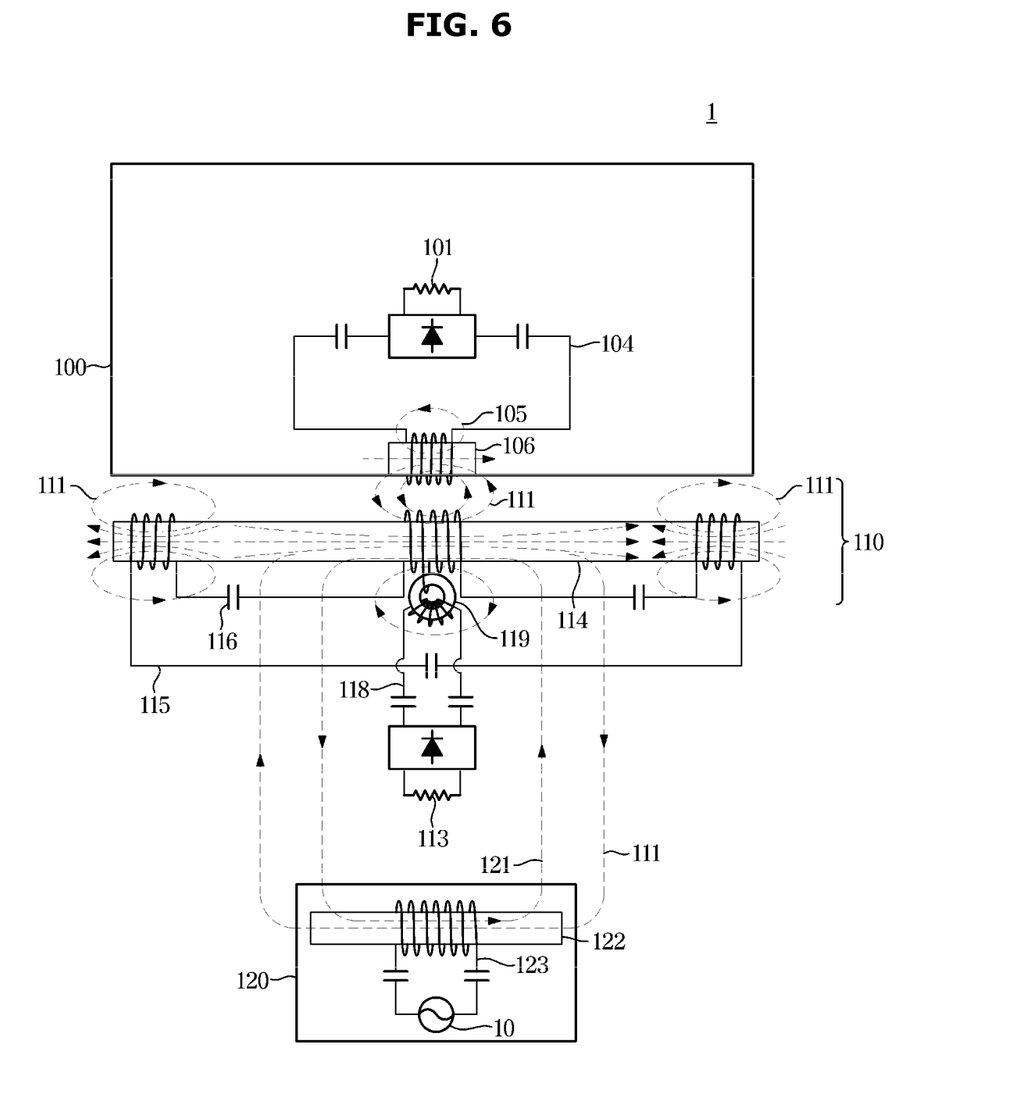
FIG. 6 is a circuit diagram of a wireless power relaying device and a display system, according to another embodiment of the disclosure.

FIG. 5 is a block diagram of a wireless power relaying device and a display system, according to another embodiment of the disclosure, and FIG. 6 is a circuit diagram of a wireless power relaying device and a display system, according to another embodiment of the disclosure.

Referring to FIG. 5, the display 100 of the display system 1 may include the image output module 101 and the display magnetic body 106, around which the display coil 104 may be wound.

As shown in FIG. 5, unlike in FIG. 2, the display magnetic body 106 is in the singular, and the display coil 104 may be wound around the single display magnetic body 106.

The speaker 110 of the display system 1 may be implemented as a wireless power relaying device. In the embodiment of the disclosure, the speaker 110 may include a relay magnetic body 114, around which the relay coil 115 may be wound.

The speaker 110 may also include the sound output module 113 that performs a function of the speaker 110 based on the received power.

The relay magnetic body 114 of FIG. 5 may be implemented as an integrated relay magnetic body 114 rather than separated magnetic bodies as shown in FIG. 2. In the embodiment of the disclosure, for simplicity in manufacturing and design, the relay magnetic body 114 included in the speaker 110 may be implemented in a single body without dividing it into three.

As shown in FIG. 6, the relay magnetic body 114 may be provided in a single integrated body, and the relay coil 115 may be wound around the relay magnetic body 114 at predefined positions. For example, the relay coil 115 may be wound on the center and both ends of the relay magnetic body 114.

The relay coil 115 wound on the center of the relay magnetic body 114 and the relay coil 115 wound on the either end of the relay magnetic body 114 may be separated from each other by a predefined distance.

The relay coils 115 wound at the predefined positions may be connected in series to each other.

As shown in FIG. 6, a direction in which the relay coil 115 is wound on the center of the relay magnetic body 114 and a direction in which the relay coil 115 is wound on either end of the relay magnetic body 114 are different. The directions in which the relay coils 115 are wound on both ends of the relay magnetic body 114 are the same.

As the relay coil 115 wound on the center of the relay magnetic body 114 and the relay coil 115 wound on the either end of the relay magnetic body 115 have different winding directions, a leaked magnetic field may be canceled out, thereby reducing EMI.

The speaker 110 may further include the power supply circuit 117 for supplying power to the speaker 110, and the power supply circuit 117 may include the power supply coil 118 wound around a power supply magnetic body 119 arranged separately from the relay magnetic body 114, and the sound output module 113 that corresponds to a load to perform a function based on the supplied power.

In the previous embodiment as described above in connection with FIG. 3, the power supply coil 118 is wound around the first relay magnetic body 114-1, but in this embodiment of the disclosure as shown in FIG. 6, the power supply coil 118 is wound around the power supply magnetic body 119.

Furthermore, as shown in FIG. 6, a thread of the relay coil 115 wound on the center of the relay magnetic body 114 is also wound around the power supply magnetic body 119.

As such, the power supply magnetic body 119 may be implemented in a toroidal type, where some of the relay coil 115 wound on the center of the relay magnetic body 114 is wound around the power supply magnetic body 119 and the power supply coil 118 is wound around the power supply magnetic body 119 to send power to the sound output module 113.

Supplying power to the speaker 110 through the power supply coil 118 separately provided on the power supply magnetic body 119 of the toroidal type may reduce power loss and eliminate the need for additional circuit installation.

In an embodiment of the disclosure, the wireless power transmitter 120 may transmit the first power signal 20 to the speaker 110 by converting the power supplied from the external power source 10 to the first magnetic field 121.

The relay coil 115 provided on the relay magnetic body 114 of the speaker 110 may produce the second magnetic field 111 by a first current induced from the first magnetic field 121 produced from the wireless power transmitter 120.

The speaker 110 may forward the second power signal 30 to the display 100 through the second magnetic field 111.

The display coil 104 provided on the display magnetic body 106 of the display 100 may produce the third magnetic field 105 by the second current induced from the second magnetic field 111 produced from the speaker 110.

The image output module 101 of the display 100 may output an image on the screen based on the power forwarded through the second current induced from the second magnetic field 111.

Referring to FIG. 6, when AC power is applied to the wireless power transmitter 120 from the power source 10, the first magnetic field 121 is produced on and around the power transmit magnetic body 122 due to the current flowing in the power transmit coil 123.

The first magnetic field 121 produced from the power transmit magnetic body 122 induces the first current that corresponds to an induced current in the relay coil 115 provided on the relay magnetic body 114 of the speaker 110.

The relay coil 115 may produce the second magnetic field 111 by the first current, and a direction of the second magnetic field 111 is opposite the direction of the first magnetic field 121.

Specifically, the first magnetic field 121 produced from the power transmit magnetic body 122 causes the induced current to flow in the relay coil 115 of the speaker 110, and the second magnetic field 111 is produced on and around the relay magnetic body 114 according to Lenz's law about the direction of electromagnetic induction.

As shown in FIG. 6, the first magnetic field 121 induces the first current in the entire relay coils 115 provided on the relay magnetic body 114 of the speaker 110, and the first current produces the second magnetic field 111 around the relay magnetic body 114.

The speaker 110 may forward the second power signal 30 to the display 100 through the second magnetic field 111.

The second magnetic field 111 produced from the relay magnetic body 114 of the speaker 110 induces the second current that corresponds to an induced current in the display coil 104 provided on the display magnetic body 106 of the display 100.

The display coil 104 may produce the third magnetic field 105 by the second current, and a direction of the third magnetic field 105 is opposite the direction of the second magnetic field 111.

Specifically, the second magnetic field 111 produced from the relay magnetic body 114 causes an induced current to flow in the display coil 104 of the display 100, and the third magnetic field 105 is produced on and around the display magnetic body 106 according to Lenz's law.

As shown in FIG. 6, the second magnetic field 111 from the relay coil 115 provided on the center of the relay magnetic body 114 induces the second current in the display coil 104 provided on the display magnetic body 106 of the display 100, and the second current produces the third magnetic field 105 around the display magnetic body 106.

The image output module 101 of the display 100 may output an image on the screen based on the power forwarded through the second current induced from the second magnetic field 111.

The wireless power transmission procedure in the display system 1 according to the embodiment of the disclosure as shown in FIG. 6 is the same as that in the previous embodiment of the disclosure as shown in FIG. 3, so the description thereof will not be repeated.

Similar to what are described above in connection with FIGS. 3 and 4, in FIG. 6, as there is a phase difference of 180° between the first magnetic field 121 produced from the wireless power transmitter 120 and the third magnetic field 105 produced from the display 100, a leaked magnetic field caused from the first magnetic field 121 is canceled out by the third magnetic field 105, thereby reducing EMI created from the first magnetic field 121.

As described above, the first magnetic field 121 is produced from the wireless power transmitter 120, and the third magnetic field 105 is produced in the display 100.

In this case, when there is a phase difference as much as 180° between the first and third magnetic fields 121 and 105, a leaked magnetic field caused from the first magnetic field 121 is canceled out by the third magnetic field 105, thereby reducing EMI created from the first magnetic field 121.

As such, with the speaker 110 installed between the wireless power transmitter 120 and the display 100 to transmit power in a wireless power relaying method, the magnetic field from the wireless power transmitter 120 and the magnetic field in the display 100 may cancel each other out, thereby reducing creation of EMI due to the leaked magnetic field.

In the meantime, although the leaked magnetic field may be reduced in the aforementioned method by locating the speaker 110 between the wireless power transmitter 120 and the display 100, a leaked magnetic field may be caused due to the second magnetic field 111 produced from the center of the relay magnetic body 114 provided in the speaker 110.

To reduce EMI due to the leaked magnetic field caused from the speaker 110, the leaked magnetic field may be canceled out by winding the relay coil 115 around the relay magnetic body 114 of the speaker 110 on either side of the relay coil 115 wound on the center at a predefined distance in a predefined direction.

In the embodiment as shown in FIG. 6, unlike the previous embodiment of FIG. 3, the relay magnetic body 114 of the speaker 110 is provided in a single integrated body rather than being divided into three.

The relay magnetic body 114 is implemented in a single body, but is wound by the relay coils 115 at the center in one direction and at either end in the other direction, so that a leaked magnetic field caused from the second magnetic field 111 produced from the center of the relay magnetic body 114 may be canceled out by the second magnetic field 111 produced from the both ends of the relay magnetic body 114, thereby reducing EMI.

It is also possible for the relay coils 115 to be wound on the center of the relay magnetic body 114 and on either end of the relay magnetic body 114 in the opposite directions to what are shown in FIG. 6.

The display system 1 according to the embodiment of the disclosure uses the speaker 110 as a wireless power relaying device to wirelessly transmit power to the display 100 while supplying power to the sound output module 113 provided in the speaker 110.

The speaker 110 may further include the power supply circuit 117 for supplying power to the speaker 110, and the power supply circuit 117 may include the power supply coil 118 wound around the power supply magnetic body 119 arranged separately from the relay magnetic body 114, and the sound output module 113 that corresponds to a load to perform a function using the supplied power.

The power supply coil 118 is wound around the power supply magnetic body 119, and a thread of the relay coil 115 wound on the center of the relay magnetic body 114 is also wound around the power supply magnetic body 119 of the toroidal type. The power supply coil 118 may be wound around the power supply magnetic body 119 to send power to the sound output module 113.

When the relay magnetic body 114 included in the speaker 110 is implemented in a single magnetic body, an extra toroidal magnetic body for sending power to the sound output module 113 may be used to distribute power through impedance conversion not to interfere with the current flowing in the relay coil 115.

The impedance conversion is made based on the number of turns of the relay coil 115 wound around the toroidal type of power supply magnetic body 119 and the number of turns of the power supply coil 118 connected to the sound output module 113.

In the embodiment of the disclosure, supplying power to the speaker 110 through the power supply coil 118 separately provided on the power supply magnetic body 119 of the toroidal type may reduce power loss and eliminate the need for additional circuit installation.

Figure 7:
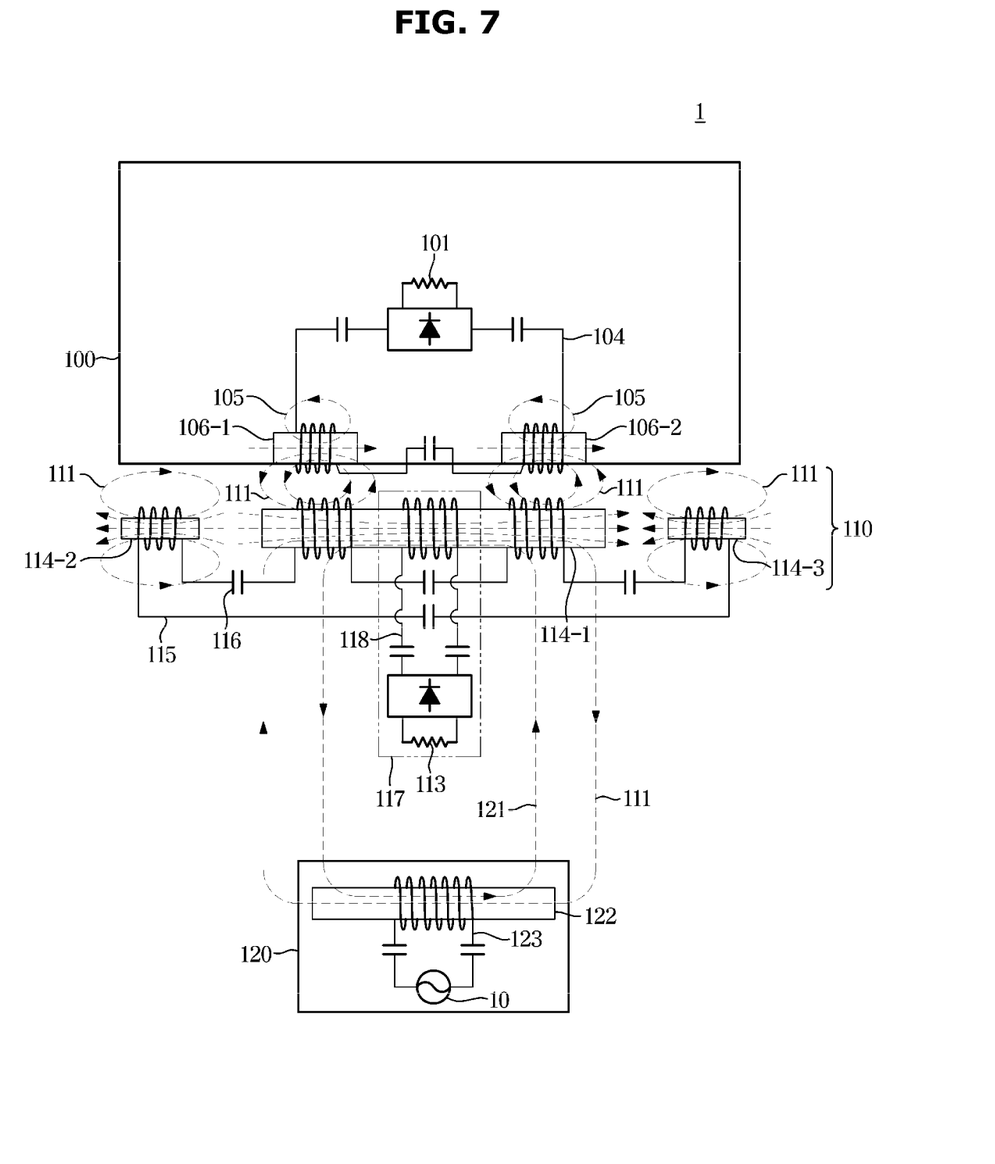
FIG. 7 shows second and third relay magnetic bodies implemented to have different thickness from that of a first relay magnetic body, according to an embodiment of the disclosure.

FIG. 7 shows second and third relay magnetic bodies implemented to have different thickness from that of a first relay magnetic body, according to an embodiment of the disclosure.

Referring to FIG. 7, in the speaker 110, the second and third relay magnetic bodies 114-2 and 114-3 located on either side of the first relay magnetic body 114-1 may be thinner than the first relay magnetic body 114-1.

Based on the nature of a coil wound around a magnetic body, an internal magnetic field is intense at the center of the magnetic body and gets weaker the father to the left and right of the magnetic body. Hence, the second relay magnetic body 114-2 arranged on the left of the first relay magnetic body 114-1 and the third relay magnetic body 114-2 arranged on the right of the first relay magnetic body 114-1 may have the same thickness as the first relay magnetic body 114-1 or may be as thin as predefined thickness.

For example, when the second and third relay magnetic bodies 114-2 and 114-3 have half the thickness of the first relay magnetic body 114-1, the weight of the speaker 110 may be reduced.

Thicknesses of the first to third relay magnetic bodies 114-1 to 114-3 may be set to predefined values.

The disclosure provides a wireless power relaying device for transmitting power wirelessly characterized to have such a structure that smoothly transmits wireless power to a display device and reduces electromagnetic interference (EMI) caused by wireless power transmission.

Meanwhile, the embodiments of the disclosure may be implemented in the form of recording media for storing instructions to be carried out by a computer. The instructions may be stored in the form of program codes, and when executed by a processor, may generate program modules to perform operation in the embodiments of the disclosure. The recording media may correspond to computer-readable recording media.

The computer-readable recording medium includes any type of recording medium having data stored thereon that may be thereafter read by a computer. For example, it may be a ROM, a RAM, a magnetic tape, a magnetic disk, a flash memory, an optical data storage device, etc.

According to embodiments of the disclosure, a wireless power relaying device for transmitting power wirelessly is characterized to have such a structure that smoothly transmits wireless power to a display device and reduces EMI caused by wireless power transmission. Furthermore, a speaker arranged near the display device may be used as the wireless power relaying device to transmit power wirelessly, to secure aesthetic and design benefits of the display system.

Several embodiments have been described above, but a person of ordinary skill in the art will understand and appreciate that various modifications can be made without departing the scope of the present disclosure. Thus, it will be apparent to those ordinary skilled in the art that the true scope of technical protection is only defined by the following claims.

What is claimed is:

1. A wireless power relaying device comprising:
first, second, and third magnetic bodies arranged so that the first magnetic body is between the second magnetic body and the third magnetic body, and a distance between the first magnetic body and the second magnet body is the same as a distance between the first magnetic body and the third magnetic body,
first, second and third relay coils wound around the first, second and third magnetic bodies, respectively, wherein
a direction in which the first relay coil is wound around the first magnetic body is different from a direction in which the second relay coil is wound around the second magnetic body and a direction in which the third relay coil is wound around the third magnetic body,
the direction in which the second relay coil is wound around the second magnetic body is the same as the direction in which the third relay coil is wound around the third magnetic body, and
the first, second, and third magnetic bodies, and the first, second and third relay coils, are thereby configured so that a current is inducible in the first, second and third relay coils by a first magnetic field from a first external device, and the induced current causes a second magnet field to be produced by the first, second and third relay coils through which a power signal is transmittable to a second external device.

2. The wireless power relaying device of claim 1, wherein the first, second and third magnetic bodies are arranged in line with each other.

3. The wireless power relaying device of claim 1, wherein:
a number of turns of the second relay coil wound around the second magnetic body and a number of turns of the third relay coil wound around the third magnetic body are the same, and
each of the number of turns of the second relay coil wound around the second magnetic body and the number of turns of the third relay coil wound around the third magnetic body is less than a number of turns of the first relay coil wound around the first magnetic body.

4. The wireless power relaying device of claim 1, wherein the first relay coil, the second relay coil and the third relay coil are connected in series.

5. The wireless power relaying device of claim 1, wherein the second magnetic body and the third magnetic body have the same thickness as the first magnetic body, or are thinner than the first magnetic body.

6. The wireless power relaying device of claim 1, further comprising:
a power supply circuit configured to supply power to the wireless power relaying device; and
a load module configured to perform a function using the supplied power.

7. The wireless power relaying device of claim 6, wherein:
the power supply circuit comprises a power supply coil arranged on the first magnetic body, and
the power supply coil is wound in the same direction as the first relay coil is wound around the first magnetic body.

8. The wireless power relaying device of claim 6, wherein the load module comprises a sound output module configured to output a sound.

9. The wireless power relaying device of claim 1, further comprising:
a power supply circuit configured to supply power to the wireless power relaying device, and including
a power supply magnetic body, and
a power supply coil arranged on the power supply magnetic body.

10. The wireless power relaying device of claim 9, wherein the first relay coil is connected to the power supply magnetic body.

11. The wireless power relaying device of claim 1, further comprising:
a fourth relay coil wound around the first magnetic body in the same direction as the first relay coil is wound around the first magnetic body,
wherein the first, second, and third magnetic bodies, and the first, second, third and fourth relay coils, are thereby configured so that a current is inducible in the first, second, third and fourth relay coils by the first magnetic field, and the induced current causes the second magnet field to be produced by the first, second, third and fourth relay coils.

12. The wireless power relaying device of claim 7, further comprising:
a fourth relay coil wound around the first magnetic body in the same direction as the first relay coil is wound around the first magnetic body, wherein
the first, second, and third magnetic bodies, and the first, second, third and fourth relay coils, are thereby configured so that a current is inducible in the first, second, third and fourth relay coils by the first magnetic field, and the induced current causes the second magnet field to be produced by the first, second, third and fourth relay coils, and
the power supply coil is between the first relay coil and the fourth relay coil.

13. A system comprising:
a wireless power transmitter configured to produce a first magnetic field from power supplied from a power source;
a speaker including
first, second, and third relay magnetic bodies arranged so that the first relay magnetic body is between the second relay magnetic body and the third relay magnetic body, and a distance between the first relay magnetic body and the second relay magnet body is the same as a distance between the first relay magnetic body and the third relay magnetic body,
first, second and third relay coils wound around the first, second and third relay magnetic bodies, respectively, wherein
a direction in which the first relay coil is wound around the first relay magnetic body is different from a direction in which the second relay coil is wound around the second relay magnetic body and a direction in which the third relay coil is wound around the third relay magnetic body, the direction in which the second relay coil is wound around the second relay magnetic body is the same as the direction in which the third relay coil is wound around the third relay magnetic body, and the first, second, and third relay magnetic bodies, and the first, second and third relay coils, are thereby configured so that a current is induced in the first, second and third relay coils by the first magnetic field produced by the wireless power transmitter, and the induced current causes a second magnet field to be produced by the first, second and third relay coils; and a display including
- a display magnetic body,
- a display coil wound around the display magnetic body, wherein the display is thereby configured so that the second magnetic produced by the first, second and third relay coils induces a current in the display coil, and
- an image output module configured to output an image using power transmitted to the display through the current induced in the display coil.

14. The system of claim 13, wherein the first, second and third relay magnetic bodies are arranged in line with each other.

15. The system of claim 13, wherein:
a number of turns of the second relay coil wound around the second relay magnetic body and a number of turns of the third relay coil wound around the third relay magnetic body are the same, and
each of the number of turns of the second relay coil wound around the second relay magnetic body and the number of turns of the third relay coil wound around the third relay magnetic body is less than a number of turns of the first relay coil wound around the first relay magnetic body.

16. The system of claim 13, wherein the first relay coil, the second relay coil and the third relay coil are connected in series.

17. The system of claim 13, wherein the second relay magnetic body and the third relay magnetic body have the same thickness as the first relay magnetic body or are thinner than the first relay magnetic body.

18. The system of claim 13, wherein:
the speaker comprises a power supply circuit configured to supply power to the speaker, and
a load module configured to perform a function using the supplied power.

19. The system of claim 18, wherein:
the power supply circuit comprises a power supply coil arranged on the first relay magnetic body, and
the power supply coil is wound in the same direction as the first relay coil wound around the first relay magnetic body.

20. A wireless power relaying device comprising:
a magnetic body,
first, second and third relay coils wound around the magnetic body, with the first relay coil being between the second relay coil and the third relay coil, wherein
a direction in which the first relay coil is wound around the magnetic body is different from a direction in which the second relay coil is wound around the magnetic and a direction in which the third relay coil is wound around the magnetic body,
the direction in which the second relay coil is wound around the magnetic body is the same as the direction in which the third relay coil is wound around the magnetic body, and
the magnetic body and the first, second and third relay coils are thereby configured so that a current is inducible in the first, second and third relay coils by a first magnetic field from a first external device, and the induced current causes a second magnet field to be produced by the first, second and third relay coils through which a power signal is transmittable to a second external device.

* * * * *

UNITED STATES PATENT AND TRADEMARK OFFICE
CERTIFICATE OF CORRECTION

| | |
|---|---|
| PATENT NO. | : 11,271,437 B2 |
| APPLICATION NO. | : 16/743447 |
| DATED | : March 8, 2022 |
| INVENTOR(S) | : Lim et al. |

It is certified that error appears in the above-identified patent and that said Letters Patent is hereby corrected as shown below:

In the Specification

Column 1, Line 11, delete "entirely." And insert --entirety.--.

Signed and Sealed this
Twenty-fourth Day of May, 2022

Katherine Kelly Vidal
*Director of the United States Patent and Trademark Office*